(12) United States Patent
Vakil et al.

(10) Patent No.: US 7,098,897 B2
(45) Date of Patent: Aug. 29, 2006

(54) TOUCH SCREEN ASSEMBLY AND DISPLAY FOR AN ELECTRONIC DEVICE

(75) Inventors: Bharat N. Vakil, Coral Springs, FL (US); James L. Tracy, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 296 days.

(21) Appl. No.: 10/610,419

(22) Filed: Jun. 30, 2003

(65) Prior Publication Data

US 2005/0007349 A1    Jan. 13, 2005

(51) Int. Cl.
*G09G 5/00*    (2006.01)

(52) U.S. Cl. .................. 345/173; 345/174; 345/175; 345/176; 345/177; 345/178; 345/179; 178/18.01; 178/18.02; 178/18.03; 178/18.04; 178/18.05

(58) Field of Classification Search ............... 345/173, 345/174–179; 178/18.01–18.03, 18.04–18.05
See application file for complete search history.

(56) References Cited

U.S. PATENT DOCUMENTS 4,317,011 A * 2/1982 Mazurk .................. 200/5 A
6,522,322 B1 * 2/2003 Maeda et al. ............... 345/173
6,809,280 B1 * 10/2004 Divigalpitiya et al. ...... 200/512
2002/0193137 A1 * 12/2002 Bank et al. ................. 455/550

* cited by examiner

*Primary Examiner*—Richard Hjerpe
*Assistant Examiner*—Leonid Shapiro
(74) *Attorney, Agent, or Firm*—Scott M. Garrett

(57) ABSTRACT

A touch screen assembly includes a first outer layer (102) and a second outer layer (110) separated by a separator layer (118). The first and second outer layers are transparent, and the separator layer has openings (120) at button locations where buttons will be defined. On each of the outer layers is a layer of transparent conductor (104, 112). On the first outer layer the transparent conductor is in the form of a contiguous trace or path. The touch screen assembly is placed on a display element (203) and images displayed on the display element can be seen through the touch screen assembly. Images such as characters are displayed at button locations, and when a user presses on one of the images the conductive layers on the first and second outer layers of the touch screen assembly come into contact.

6 Claims, 5 Drawing Sheets

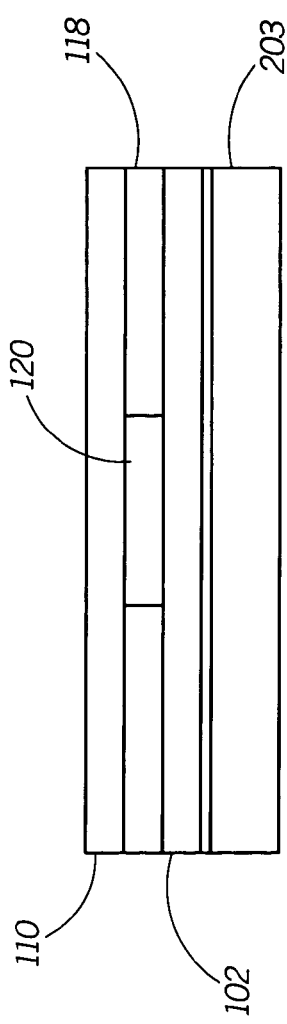
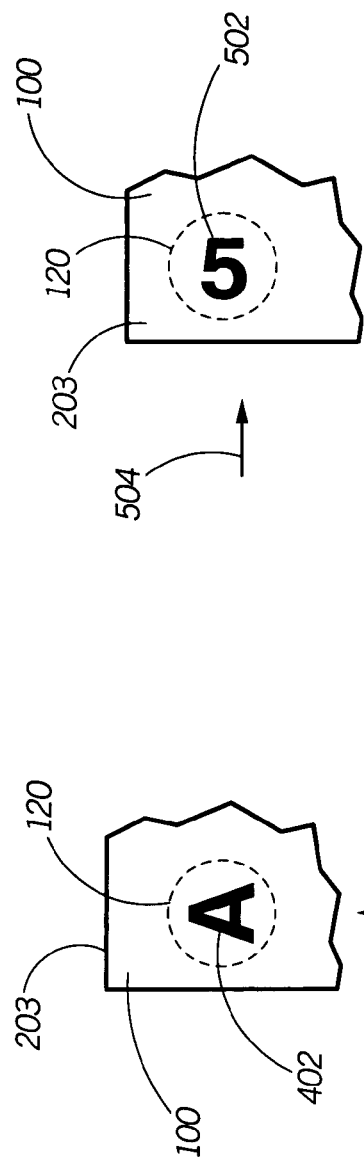
FIG. 3
FIG. 4
FIG. 5

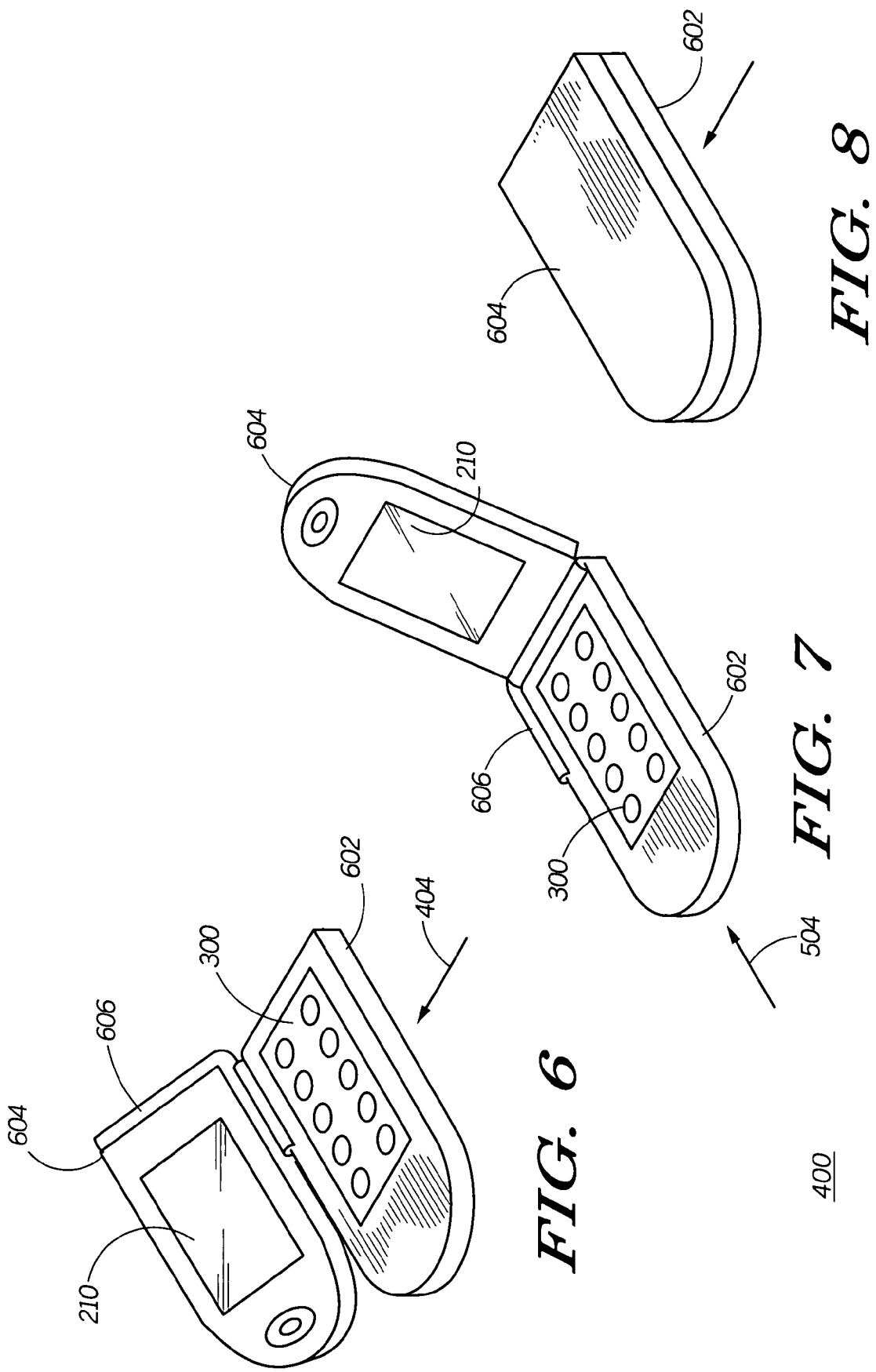

TOUCH SCREEN ASSEMBLY AND DISPLAY FOR AN ELECTRONIC DEVICE

TECHNICAL FIELD

This invention relates in general to displays for electronic devices, and more particularly to touch screen displays for electronic devices, and further to touch screen displays for electronic devices operable in more than one configuration.

BACKGROUND OF THE INVENTION

Portable electronic devices have been designed to perform a large variety of functions, including personal digital assistants (PDAs), pagers and two-way pagers, cellular and radiotelephones to name some of the most popular devices. All of these devices store information and perform tasks under direction of the user of the device, and therefore have a user interface. A typical user interface includes a means for displaying information, a means for inputting information and operation control, and often a means for playing sounds and audio signals.

One of the most common means for allowing a user to control the device or input, information is a keypad or buttons. A keypad is a collection of buttons that are typically arranged in a conventional format, depending on the type of device. For example, two-way pagers typically have a so called "QWERTY" keypad, similar to that of a keyboard for a computer. Cellular phones typically have a conventional pushbutton telephone keypad layout, with the addition of specialized keys for operating the cellular phone. In both of these devices, perhaps the most widely used button mechanism is a popple switch button. A small dome may be fabricated from various grades of sheet-metal, typically 0.005" stainless steel, rendering the entire popple as a conductive element for switching functionality; or in an alternative embodiment, a dome is formed from a non-conductive polymer sheet (such as Mylar™) but with the addition of a conductive element (such as Carbon based Ink). In either method of popple construction, (metal or polymer) the popple is adhered into place using a separate tape with adhesive, and positioned on a printed circuit board. When the popple is depressed, it creates a connection between the conductor layer disposed on the PCB and the conductor pad under the popple dome, completing an electrical circuit which is detected by a controller of the device. To press the popple, a mechanical actuator is disposed over the popple. Typically an image or character is printed on the actuator indicating when that particular button is pushed, that particular character will be entered, or an action associated with the image will be taken by the device. A very similar button mechanism is a membrane button. A membrane button may use a popple dome and have the character or image printed on the dome, or it may simply be two insulator layers separated by a spacer. Each of the insulator layers has a conductor disposed on them which make contact when pushed or pressed together. By printing images or characters on the button, however, limits the button to a fixed function or character or number. Sometimes one of several alternative characters may be selected by repeatedly pressing the button until the desired character appears on a display of the device, as is common on cellular phones.

The limitation of fixed buttons is somewhat alleviated by the use of so called "soft" keys. Soft keys are buttons located near a display of the device, and in the course of operating the device, various characters, images, or words will be displayed on the display at a location corresponding to the button. Typically at least two soft keys are used so as to permit the user to select one of two alternative actions. In addition to popple and membrane buttons, numerous other button mechanisms are known. Other than soft keys or repeated pressing to select alternative characters, however, these buttons are essentially fixed in meaning.

An alternative to fixed buttons is the touch screen display. A touch screen display comprises a conventional display with a touch detection overlay. Information can be displayed on the display and the user touches the display at a desired location corresponding to the desired information, image, or icon. When the user touches the touch detection overlay, the electrical parameters are changed, and by sensing the change from various positions at the edge of the overlay the position where the user touched the overlay can be inferred. Although it allows a user to touch anywhere in the two dimensional plane of the display, the algorithm that performs this inference is fairly complicated. In fact, very few portable electronic devices use this type of input mechanism partly because of the complexity involved, and also because of the lack of applications that require being able to detect a touch anywhere on the screen.

BRIEF DESCRIPTION OF THE DRAWINGS

FIG. 3 shows a side view of a touch screen display, in accordance with the invention;

FIG. 4 shows a portion of a display using a touch screen for a portable electronic device operated in a first configuration;

FIG. 5 shows a portion of a display using a touch screen for a portable electronic device operated in a second configuration;

FIG. 6 shows a portable electronic device utilizing a touch screen and configured in a first configuration;

FIG. 7 shows a portable electronic device utilizing a touch screen and configured in a second configuration;

FIG. 8 shows a portable electronic device utilizing a touch screen and in a closed configuration.

DETAILED DESCRIPTION OF A PREFERRED EMBODIMENT

Figure 1:
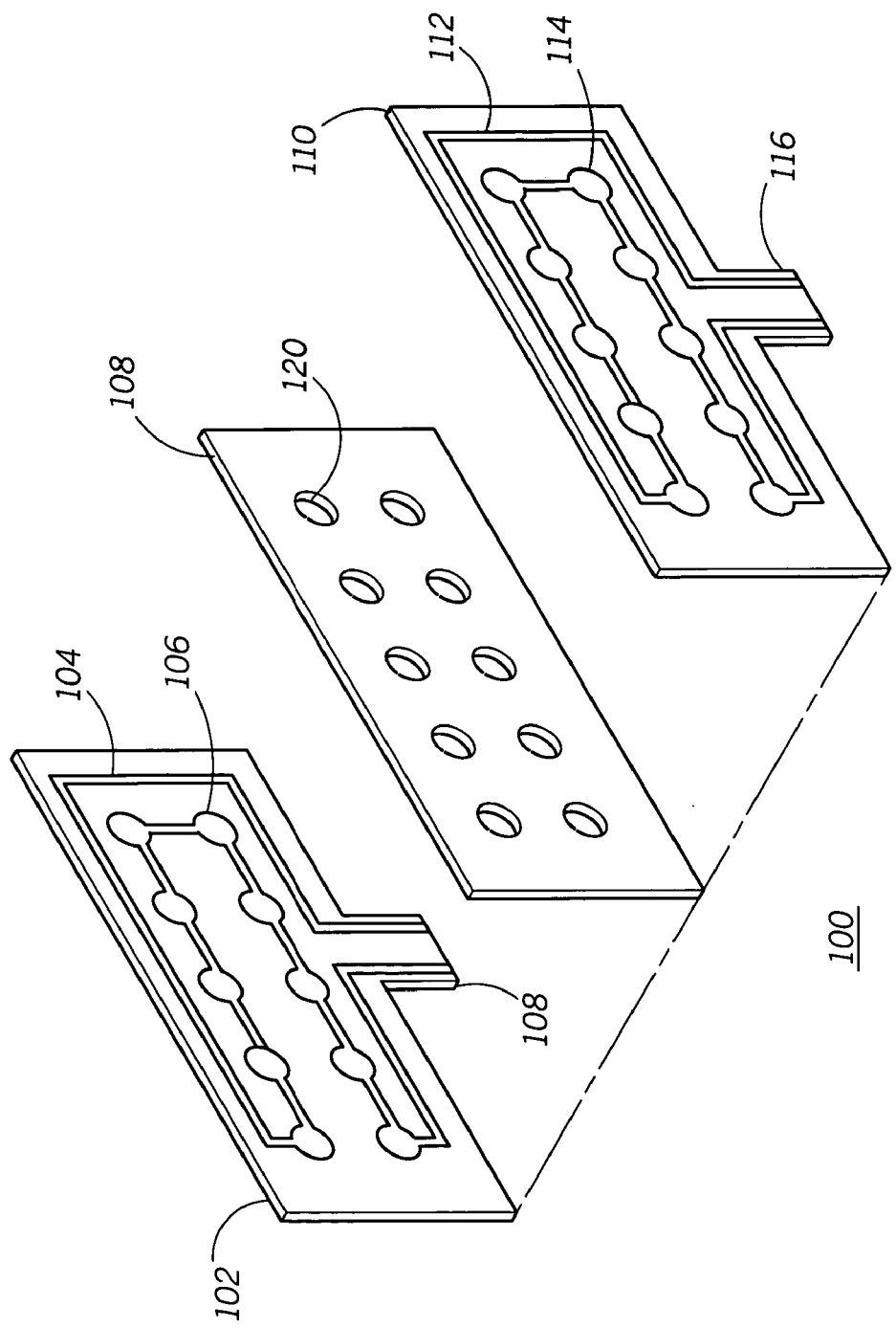
FIG. 1 shows an exploded isometric view of a touch screen assembly, in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of the complexity of touch screens and the limited utility of fixed buttons by providing a simple touch screen button apparatus. A first layer of transparent insulator has a trace of transparent conductive material disposed thereon. The conductive material, while conductive in thick, wide layers, provides substantial electrical resistance when disposed as a thin trace. Second insulating layer likewise has a layer of transparent conductive material on it. The two layers with transparent conductor are separated by a separator layer of insulating material. The separator layer has openings formed therethrough corresponding to button locations. A voltage potential is applied to the conductive trace, and when a user presses the first and second insulating layers together through one of the openings in the separator layer. The voltage is divided along the trace on the first layer, producing different voltage levels at the different button locations. These different voltage levels are read via the second layer and the conductive material disposed thereon. The voltage level change is read by a controller, and used to determine which button location was pressed by the user.

Referring now to FIG. 1, there is shown an exploded isometric view of a touch screen assembly 100, in accordance with the invention. The assembly comprises a first outer layer of transparent insulator 102 having a first trace of transparent conductor 104 disposed thereon on an inside surface. The insulator material may be one of a variety of materials such as, for example, polymer sheet, or polyester film, such as Mylar™ by the DuPont Corporation, which is typically classified by one skilled in the art as a Polyethylene Terephthalate, or PET. The transparent conductor is preferably indium tin oxide (ITO), which is suitably transparent in thin layers. Furthermore, the conductor layer is less conductive than conductive-materials such as copper, for example, and provides significant electrical resistance. Along the trace, at locations corresponding to button locations, the trace may be enlarged to form pads or pad segments, such as pad segment 106. The conductor trace preferable starts and ends on tab 108 so as to facilitate electrical connection to control circuitry. The assembly further comprises a second outer layer of transparent insulator 110 having a second trace of transparent conductor 112 disposed thereon on an inside surface. For the second outer layer, the transparent conductor may be arranged to match the path and shape of the trace on the first layer, or it may simply be over the entire layer, so long as there is a contiguousness to it that covers the button locations. Preferably, however, the second trace also has pad segments 114. As with the first trace on the first outer layer, the second trace preferable starts and ends on a tab 116 to facilitate electrical connectivity to control circuitry. Disposed between the first and second outer layers is a separator layer 118 formed of transparent insulator disposed between the first and second outer layers and having a plurality of openings 120 positioned therethrough, each of the openings corresponding to one of a plurality of button locations. To hold the three layers together, an adhesive may be disposed on both major surfaces of the separator layer. The two outer layers are then aligned with the separator layer. When so assembled, the conductor layers may be pressed into contact by a user by pressing on the second outer layer at one of the button locations.

Figure 2:
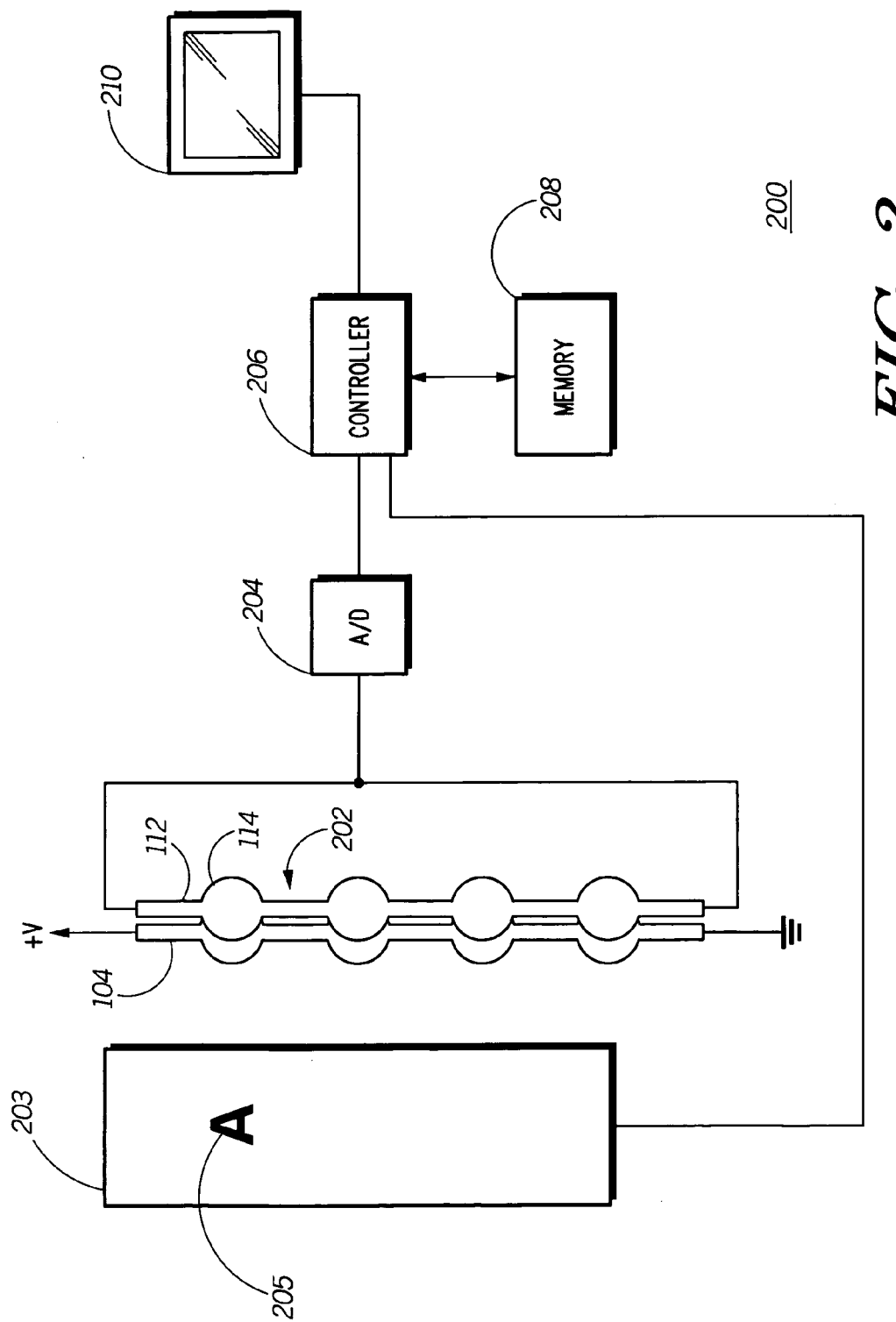
FIG. 2 shows an electrical schematic of a touch screen apparatus and detection circuitry, in accordance with the invention.

Referring now to FIG. 2, there is shown an electrical schematic 200 of a touch screen apparatus and detection circuitry, in accordance with the invention. Shown here are segments of the first and second conductor layers 104, 112. The pad segments 106 and 114 are aligned at button locations so that when they are pressed together, as indicated by arrow 202, for example, they make electrical contact. Since the outer layers and the conductor trace material is transparent, the assembly can be disposed over a display 203 and an image or character 205 may be displayed on the display and seen by a user through the assembly at the button location.

To detect the press of a user, the first conductive trace 104 has a voltage potential V+ applied to it. Because it is resistive, the voltage at any point along the trace reduces as the position gets closer to the ground potential. The second conductive trace 112 is connected to a sensing circuit, such as, for example, an analog to digital (A/D) converter 204. The sensing circuit has a high impedance input to which the second conductive trace is connected. When the second conductive trace makes contact with the first conductive trace, the voltage potential at the contact point is sensed by the sensing circuit. Because the sensing circuit has a high impedance input very little current flows through the second conductive trace 112, and therefore very little voltage drop is evident between the contact point and the input of the sensing circuit. As such, the voltage at the input of the sensing circuit is substantially equal to the voltage at the contact point. Since the voltage on the first conductive trace 104 decreases between the point where the voltage potential V+ and the reference or ground level, the voltage evident at the various pad segments is different. At each pad segment there is a range of voltages that may be evident, depending on where within the pad segment contact is made. In the preferred embodiment the A/D converter converts the voltage at the input of the A/D to a digital value. The digital value is output to a controller 206 which occasionally looks at the value output by the A/D converter, and determines if the value is different than the value that would be read when the two conductive traces are not pressed together and the assembly is in an idle state. When the controller detects a change in state from the idle state, the controller compares the value, or an average value produced by averaging two or more readings, with a table in a memory 208. As will be described herein, the table defines ranges of values, each different range of values corresponding to a different button location, indicating that the user has pressed at the corresponding button location. The table may also indicate the image or character to be displayed on the display 203, or on a secondary display 210. Alternatively the table may indicate an action for the portable electronic device to take, such as, for example, displaying a list of phone numbers. The sensing of which button location is pressed by the user can be accomplished in a variety of ways besides the preferred means described here. For example, a comparator may be used to sense a change from the idle state, and the output of the comparator may be connected to an interrupt input of the controller. Then the controller would only read the value of the A/D upon receiving an interrupt indicative of a button press. Alternatively, a series of window comparators may be used with one set for each button location. The output of each set of window comparator would change from an idle state to an active state when the corresponding button is pressed. Each output would be connected to a digital input of the controller, and when the controller senses an input changing to an active level, it may take an action corresponding to the button location being pressed. These are but a few examples of means for sensing which of a plurality of buttons are being pressed.

Referring now to FIG. 3, there is shown a side view of a touch screen display 300, in accordance with the invention. The display assembly includes a first transparent layer 102 and a second transparent layer 110 separated by a separator layer 118. The touch screen assembly is disposed on a display 203. The display may be any variety of displays, such as, for example, liquid crystal, electroluminescent, and so on. An opening 120 in the separator layer 118 allows a user to press the transparent layers 102 and 118 into contact with each other, and the conductive traces disposed thereon. It should be noted that the thickness of the separator layer 118 may vary from that of the preferred embodiment, and that the thicker it becomes, the greater the distance required of the second transparent layer 110 to collapse and create the switched signal occurrence; although the outer layers 110 and 102 are typically constructed from a grade of PET, which is quite flexible, but therefore would result in a greater distance to activate the switch, hence the greater force would be required to cause such increased deflection.

Referring now to FIGS. 4 and 5, there is shown a portion of a display using a touch screen for a portable electronic device operated in a first configuration, and a portion of a display using a touch screen for a portable electronic device operated in a second configuration, respectively. In each case there is a display 203 with a touch screen assembly 100 disposed on the display. Since the outer layers of the assembly are transparent, as is the conductive material disposed on them, a user can see what is displayed on the display at the button location, corresponding to the opening 120 in the separator layer. If the separator layer is transparent, then all of the display can be seen. However it is contemplated that for some applications it may be desirable to have an opaque separator to mask the display other than at the button location or locations. This visual effect may also be achieved by placement of an opaque molded polymer housing, wherein the strategically positioned openings would correspond to the switches described. At the button locations on the display are displayed images or graphics, such as characters 402 and 502, respectively. The portable electronic device displays information on the display 203, and when the user presses on the image the user will press the touch screen causing the assembly layers of the invention to press together. The press is sensed by the control circuitry, as described hereinabove, at which time, the character displayed on the LCD or other display device is updated, or somehow changed to display alternate information.

In the preferred embodiment, the portable electronic device is a multi-configuration device. Examples of different configurations are shown in FIGS. 6 and 7, which show a portable electronic device utilizing a touch screen and configured in a first configuration, and a portable electronic device utilizing a touch screen and configured in a second configuration, respectively. In FIG. 6 the device is shown in what can be referred to as a landscape mode, and may, for example, function as a two way pager. In FIG. 7 the device is shown in what may be referred to as a portrait mode, and may, for example, operate as a cellular telephone. The device has two portions 602 and 604 that are joined by a hinge 606. The device comprises a touch screen display 300 to display images at button locations. The device may also comprise a secondary display 210 for displaying other information to the user, such as text the user has entered into the device by pressing buttons on the touch screen display 300.

When operated in the first configuration, the user views the touch screen display from a perspective along line 404. As such, characters such as character 402 are displayed in a first orientation. When operated in the second configuration, the user views the touch screen display from a perspective along line 504. As such, characters such as character 502 are displayed in a second orientation. Furthermore, characters 402 and 502 may belong to a first and second character set, respectively. The first and second character sets are displayed at differing orientations on the touch screen display 300, and during different configurations of the device. When the user in not using the device, it may be placed in a closed configuration, as shown in FIG. 8. In which case the display or displays are preferably turned off so as to conserve battery life. If the user desires to, for example, send a text page, the user would open the device into the first configuration as shown in FIG. 6. If the user desires to use the device as a telephone, the user would open the device into the second configuration, as shown in FIG. 7.

Figure 9:
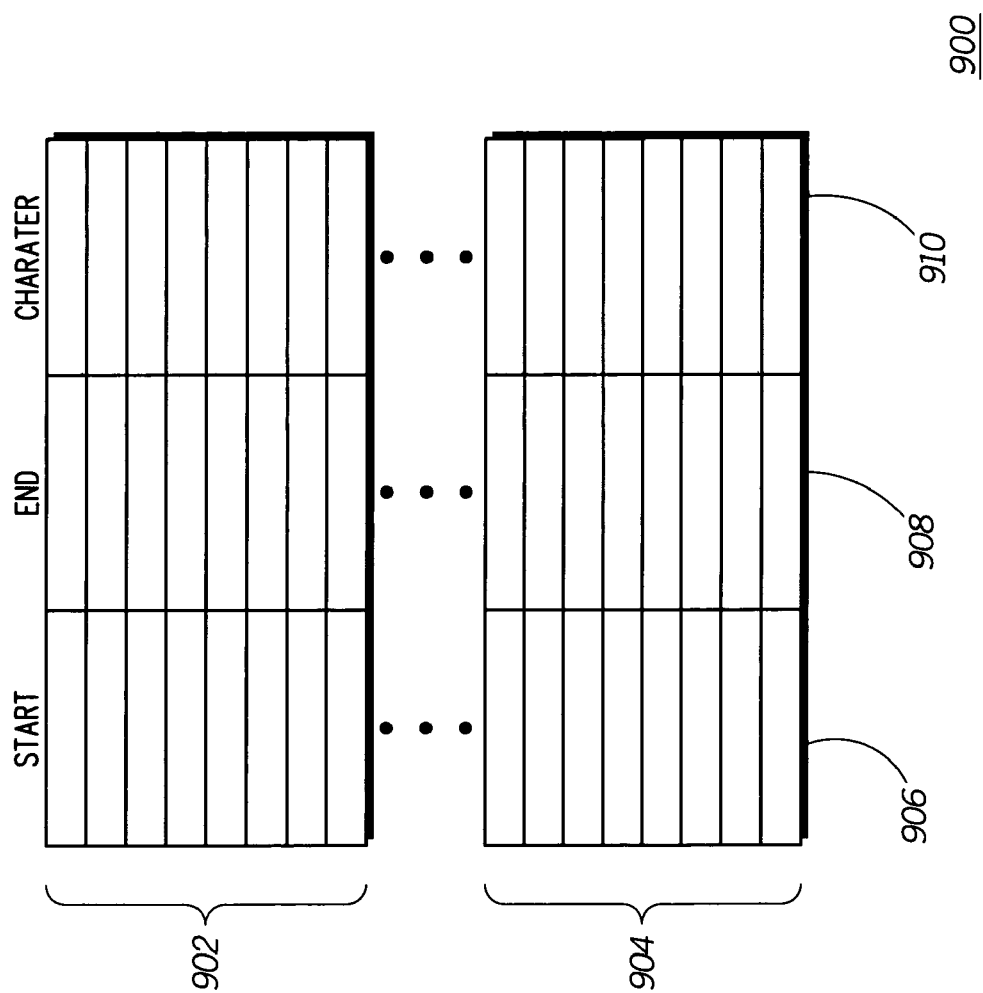
FIG. 9 shows a memory table for selecting characters to be displayed on a display of a portable multi-configuration electronic device, in accordance with the invention.

Referring now to FIG. 9, there is shown a memory table 900 for selecting characters to be displayed on a display of a portable multi-configuration electronic device, in accordance with the invention. More precisely, the table allows the controller to determine which button location the user has pressed. For each configuration, there may be a separate table, so for the first configuration there may be a first table 902, and for the second configuration there may be a second table 904. Each table has as many entries (rows) as there are button locations. In the case where a button press is detected by sensing the voltage at a button location, which may have some variance, it is contemplated that each button location may be defined by a range of values. Thus, there is a start value 906 and an end value 908 for each button location. If the voltage sensed by the detection circuit falls into one of the ranges defined by these columns, then it indicates the corresponding button was pressed. The table may further include a column for indicating the image or character to be displayed at the button location, or a pointer to a memory location where an opcode or instruction is stored which the controller executes, for example. Optionally, if characters are stored in the column 910, these characters may be fetched and displayed on a different portion of the display, or on a secondary display, to provide visual feedback to the user that the button press was detected. Alternatively, if, as suggested hereinabove, window comparators are used, the particular row to be accessed may be indicated by which of the window comparator circuits asserts an active level output, and the controller may simply fetch the appropriate character or pointer. It is also contemplated that rather than having multiple tables for each of the various configurations, there may simply be additional columns provided for each different configuration. Generally, there are numerous ways by which characters and instructions associated with each button location for each configuration can be mapped, and these are but a few examples.

Therefore, the invention provides for a touch screen or touch screen assembly for an electronic device. The touch screen assembly has a first outer layer of transparent insulator with a first trace of transparent conductor disposed thereon on an inside surface, and a second outer layer of transparent insulator having a second trace of transparent conductor disposed thereon on an inside surface. The two outer layers are separated by a separator layer formed of transparent insulator. The separator has a plurality of openings formed therethrough, and each of the openings corresponds to one of a plurality of button locations. To detect the press of one of the buttons defined by the button locations, a voltage is applied to the first trace of transparent conductor thereby creating a voltage gradient across it. The voltage level at the pressed button location may be read via the second trace of transparent conductor when the first and second traces of transparent conductor make contact upon being pressed together. To perform the detection, the second trace of transparent conductor is electrically coupled to a detection circuit for detecting the voltage level at the button location. In the preferred embodiment, the first and second traces of transparent conductor are formed of indium tin oxide. To enhance the likelihood that the first and second traces will make contact, it is preferred that the first and second traces of transparent conductor form pad segments at the button locations.

Furthermore, it is contemplated that the invention provides a transparent push button apparatus for an electronic device comprised of a first outer layer of transparent insulator having a first trace of transparent conductor disposed thereon on an inside surface and a second outer layer of transparent insulator having a second trace of transparent conductor disposed thereon on an inside surface. The two outer layers being separated by a separator layer formed of transparent insulator disposed between the first and second outer layers and having an opening formed therethrough, and wherein the opening corresponds to a button location. Located in correspondence with the button location is a display means or display element for displaying a first image when the electronic device is operated in a first configuration of operation, and for displaying a second image when the electronic device is operated in a second configuration of operation. In the instance where more than one push button or touch button is needed, the invention further provides that the separator layer comprises a plurality of openings, and each of the plurality of opening corresponds to a different one of a plurality of button locations. The display means displays a first image set having a plurality of images when the electronic device is operated in the first configuration of operation, and a second image set having a plurality of images when the electronic device is operated in the second configuration of operation. Each of the plurality of images in the first and second image sets are displayed at a different one of the plurality of button locations so as to be visible to a user of the electronic device.

Furthermore, the inventions provides for a multi-configuration portable electronic device having a first portion and a second portion. The first and second portions are hingeably joined and moveable with respect to each other, and can be moved into at least a first configuration and a second configuration. The multi-configuration portable electronic device also has a touch screen display disposed on the first portion. The touch screen display includes a display element with a touch screen assembly disposed on the display element. The touch screen assembly is comprised of a first outer layer of transparent insulator having a first trace of transparent conductor disposed thereon on an inside surface, and a second outer layer of transparent insulator having a second trace of transparent conductor disposed thereon on an inside surface. The outer layers are separated by a separator layer formed of transparent insulator disposed between the first and second outer layers and having a plurality of openings formed therethrough. Each of the openings corresponding to one of a plurality of button locations.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. The multi-configuration portable electmnic device, comprising:
    a first portion and a second portion, the first and second portion hingeably joined and moveable with respect to each other into at least a first configuration and a second configuration;
    a touch screen display disposed on the first portion, the touch screen display including a display element and a touch screen assembly disposed on the display element, the touch screen assembly comprising:
        a first outer layer of transparent insulator having a first trace of transparent conductor disposed thereon on an inside surface;
        a second outer layer of transparent insulator having a second trace of transparent conductor disposed thereon on an inside surface; and
        a separator layer formed of transparent insulator disposed between the first and second outer layers and having a plurality of openings formed therethrough, each of the openings corresponcbng to one of a plurality of button locations;
        wherein the first and second transparent conductor traces intersect at the button locations;
    wherein:
        when the multi-configuration portable electronic device is operated in the first configuration, a first image set is displayed on the display element, the first image set comprising a plurality of images, each one of the images being displayed at a different one of the plurality of button locations; and
        when the multi-configuration portable electronic device is operated in the second configuration, a second image set is displayed on the display element, the second image set comprising a plurality of images, each one of the images being displaytcl at a different one of the plurality of button locations.

2. The multi-configuration portable electronic device as defined in claim 1, where in the first and second image sets comprise characters, the characters having an orientation, the first and second image sets having different orientations.

3. The multi-configuration portable electronic device as defined in claim 1, wherein a voltage is applied to the first trace of transparent conductor thereby creating a voltage gradient across the first trace of transparent conductor, and wherein a voltage level at the button location may be read via the second trace of transparent conductor when the first and second traces of transparent conductor make contact upon being pressed together by a user of the touch screen display.

4. The multi-configuration portable electronic device as defined in claim 3, wherein the second trace of transparent conductor is electrically coupled to a detection circuit for detecting the voltage level at the button location.

5. The multi-configuration portable electronic device as defined in claim 1, wherein the first and second traces of transparent conductor are formed of indium tin oxide.

6. The multi-configuration portable electronic device as defined in claim 1, wherein the first and second traces of transparent conductor form pad segments corresponding to the button locations.

* * * * *